US012681318B2

(12) United States Patent
Yan et al.

(10) Patent No.: US 12,681,318 B2
(45) Date of Patent: Jul. 14, 2026

(54) OPTICAL COMPONENT AND LASER RADAR SYSTEM

(71) Applicant: Yinwang Intelligent Technologies Co., Ltd., Shenzhen (CN)

(72) Inventors: Lei Yan, Wuhan (CN); Ke Huang, Wuhan (CN); Wei Xiong, Wuhan (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 954 days.

(21) Appl. No.: 17/891,293

(22) Filed: Aug. 19, 2022

(65) Prior Publication Data

US 2022/0413313 A1 Dec. 29, 2022

Related U.S. Application Data

(63) Continuation of application No. PCT/CN2020/075906, filed on Feb. 19, 2020.

(51) Int. Cl.
| | |
|---|---|
| *G02B 27/09* | (2006.01) |
| *G01S 7/481* | (2006.01) |
| *G01S 7/499* | (2006.01) |
| *G01S 17/931* | (2020.01) |

(52) U.S. Cl.
CPC ........ *G02B 27/0966* (2013.01); *G01S 7/4814* (2013.01); *G01S 7/499* (2013.01); *G01S 17/931* (2020.01)

(58) Field of Classification Search
None
See application file for complete search history.

(56) References Cited

U.S. PATENT DOCUMENTS

| | | |
|---|---|---|
| 4,203,652 A | 5/1980 | Hanada |
| 2007/0019702 A1 | 1/2007 | Day et al. |
| 2017/0235057 A1 | 8/2017 | Hemenway et al. |
| 2019/0173255 A1 | 6/2019 | Gurgov |
| 2019/0203897 A1 | 7/2019 | Kim et al. |
| 2019/0265495 A1 | 8/2019 | Kobayashi et al. |

FOREIGN PATENT DOCUMENTS

| | | |
|---|---|---|
| CN | 1553243 A | 12/2004 |
| CN | 1928625 A | 3/2007 |
| CN | 101916964 A | 12/2010 |
| CN | 102914872 A | 2/2013 |
| CN | 104696448 A | 6/2015 |
| CN | 204631362 U | 9/2015 |
| CN | 205790934 U | 12/2016 |

(Continued)

*Primary Examiner* — Hovhannes Baghdasaryan
(74) *Attorney, Agent, or Firm* — Conley Rose, P.C.

(57) ABSTRACT

An optical component includes a first lens and a second lens that are arranged in sequence in an emission direction of a beam and are disposed opposite relative to each other. The first lens has a first shaping surface and a second shaping surface that are disposed opposite to each other, and the second lens has a third shaping surface and a fourth shaping surface that are disposed opposite to each other. The first shaping surface and the third shaping surface form a first shaping surface group to perform optical path collimation on a first polarization direction of the beam. The second shaping surface and the fourth shaping surface form a second shaping surface group to perform optical path collimation on a second polarization direction of the beam.

21 Claims, 2 Drawing Sheets

(56)          References Cited

FOREIGN PATENT DOCUMENTS

| | | | |
|---|---|---|---|
| CN | 106873168 | A | 6/2017 |
| CN | 107346062 | A | 11/2017 |
| CN | 108604016 | A | 9/2018 |
| CN | 109975985 | A | 7/2019 |
| JP | 3207939 | U | 12/2016 |

OPTICAL COMPONENT AND LASER RADAR SYSTEM

CROSS-REFERENCE TO RELATED APPLICATIONS

This is a continuation of International Patent Application No. PCT/CN2020/075906 filed on Feb. 19, 2020, which is hereby incorporated by reference in its entirety.

TECHNICAL FIELD

This disclosure relates to the technical field of laser devices, and in particular, to an optical component and a laser radar system.

BACKGROUND

With development of an automatic driving technology, an increasingly high requirement is imposed on a capability of a vehicle to perceive a surrounding environment. As an important sensor used by the vehicle to perceive the surrounding environment, a laser radar system plays an extremely important role.

In the laser radar system, a beam emitted by a laser is collimated by using an optical component such as a lens, to obtain parallel beams with relatively concentrated energy. In a conventional technology, there are a relatively large quantity of lenses in the optical component, and costs are relatively high, and in addition, a total optical length of the optical component is relatively large, and consequently, a volume of the entire laser radar system is relatively large, and this is not conducive to installation and use.

SUMMARY

This disclosure provides an optical component and a laser radar system, to reduce a quantity of lenses used in an optical component in a laser radar system, reduce a total optical length of the optical component, and reduce a volume of the laser radar system.

According to a first aspect, an optical component is provided to collimate a beam emitted by a laser. The optical component includes a first lens and a second lens, and the first lens and the second lens are arranged in sequence in an emission direction of the beam and are disposed opposite relative to each other. The first lens has a first shaping surface and a second shaping surface that are disposed opposite each other, and the second lens has a third shaping surface and a fourth shaping surface that are disposed opposite to each other. The beam has a first polarization direction and a second polarization direction that are perpendicular to each other. The first shaping surface and the third shaping surface form a first shaping surface group, to perform optical path collimation on the first polarization direction of the beam. The second shaping surface and the fourth shaping surface form a second shaping surface group, to perform optical path collimation on the second polarization direction of the beam. The two opposite surfaces of the first lens and the two opposite surfaces of the second lens are fully used to respectively form the first shaping surface group and the second shaping surface group, to respectively collimate the two polarization directions of the beam. In this way, a quantity of used lenses is reduced, costs are reduced, and a total optical length of the optical component is reduced. The first shaping surface is used to diverge an angle of divergence in the first polarization direction of the beam, and the third shaping surface is used to collimate beams emitted by the first lens to obtain parallel beams in the first polarization direction, to further shorten the total optical length while ensuring a required focal length in the first polarization direction. Therefore, a volume of a laser radar system is reduced.

Locations of the first shaping surface, the second shaping surface, the third shaping surface, and the fourth shaping surface may be set in a plurality of manners. In a specific implementation, the first shaping surface is located on a surface of the first lens that is away from the second lens, the third shaping surface is located on a surface of the second lens that is away from the first lens, the second shaping surface is located on a surface of the first lens that faces the second lens, and the fourth shaping surface is located on a surface of the second lens that faces the first lens.

Shapes of the first shaping surface and the third shaping surface may be in a plurality of forms, provided that the first shaping surface can diverge the angle of divergence in the first polarization direction of the beam, and the third shaping surface collimates the beams to obtain parallel beams in the first polarization direction. In a specific implementation, both the first shaping surface and the third shaping surface are cylinders whose generatrices are parallel to the second polarization direction.

In a specific implementation, both curvature of the first shaping surface and curvature of the third shaping surface increase as a distance between a generatrix of the first shaping surface and a generatrix of the third shaping surface increases, to ensure that the beams are better collimated in the first polarization direction.

In a specific implementation, the second shaping surface is used to converge an angle of divergence in the second polarization direction of the beam, and the fourth shaping surface is used to collimate beams emitted by the first lens to obtain parallel beams in the second polarization direction. Finally, the beams are collimated in the second polarization direction.

Locations of the second shaping surface and the fourth shaping surface are set in a plurality of manners. In a specific implementation, the second shaping surface is located on the surface of the first lens that faces the second lens, and the fourth shaping surface is located on the surface of the second lens that faces the first lens.

Shapes of the second shaping surface and the fourth shaping surface may be in a plurality of forms, provided that the second shaping surface can diverge the angle of divergence in the second polarization direction of the beam, and the fourth shaping surface collimates beams to obtain parallel beams in the second polarization direction. In a specific implementation, both the second shaping surface and the fourth shaping surface are cylinders whose generatrices are parallel to the first polarization direction.

In a specific implementation, both curvature of the second shaping surface and curvature of the fourth shaping surface increase as a distance between a generatrix of the second shaping surface and a generatrix of the fourth shaping surface increases, to ensure that beams are better collimated in the second polarization direction.

In another specific implementation, the second shaping surface is a cylinder whose generatrix is parallel to the first polarization direction, the second shaping surface is used to collimate the beams to obtain parallel beams in the second polarization direction, and the fourth shaping surface is a plane, or the second shaping surface is a plane, the fourth shaping surface is a cylinder whose generatrix is parallel to the first polarization direction, and the fourth shaping surface is used to collimate the beams to obtain parallel beams in the second polarization direction.

In a specific implementation, the first polarization direction is a slow axis direction of the beam, and the second polarization direction is a fast axis direction of the beam. In another specific implementation, alternatively, the first polarization direction is a fast axis direction of the beam, and the second polarization direction is a slow axis direction of the beam.

According to a second aspect, a laser radar system is provided. The laser radar system includes a laser and the optical component described in the foregoing technical solution, and a beam emitted by the laser passes through the first lens and the second lens in sequence. Because a total optical length of the optical component is compressed, it is conducive to reduction of a total volume of the laser radar system. In addition, because a quantity of lenses in the optical component is reduced, it is conducive to reduction of costs of the laser radar system.

DESCRIPTION OF EMBODIMENTS

To make objectives, technical solutions, and advantages of this disclosure clearer, the following further describes this disclosure in detail with reference to accompanying drawings.

To facilitate understanding of an optical component provided in embodiments of this disclosure, an application scenario of the optical component is first described. The optical component is applied to a laser radar system and is configured to collimate a beam emitted by a laser. The laser radar system may be a vehicle-mounted laser radar system in a self-driving car.

Figure 1A:
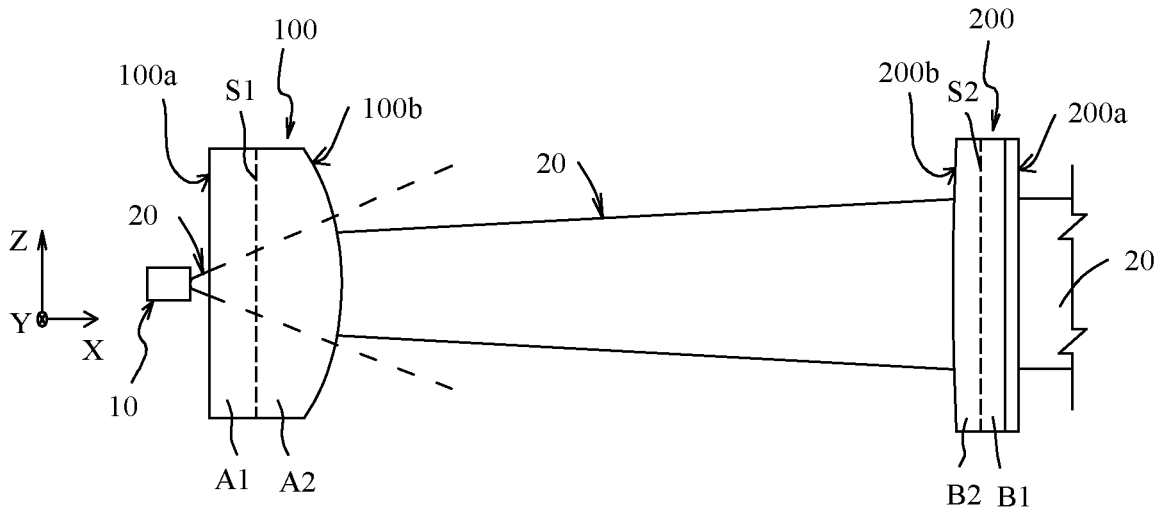
FIG. 1A is a side view depiction of when a laser cooperates with an optical component provided in an embodiment of this disclosure.
Figure 1B:
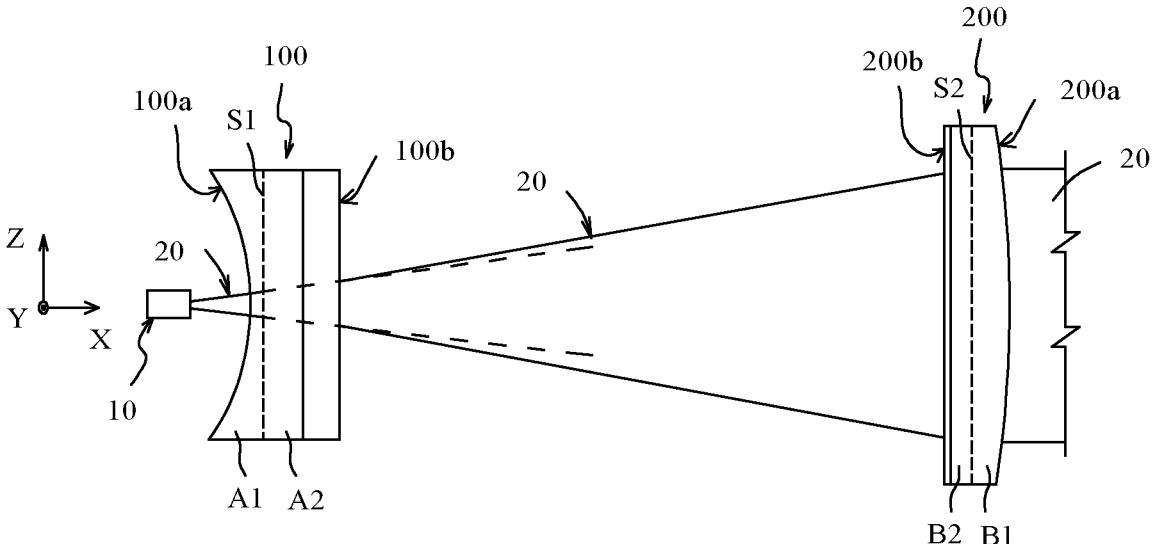
FIG. 1B is a cutaway side view of the embodiment shown in FIG. 1A depicting when a laser cooperates with an optical component.
Figure 2:
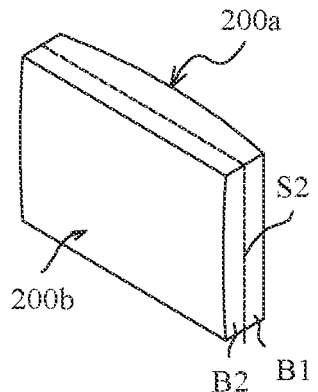
FIG. 2 is a three-dimensional diagram of a perspective of an optical component provided in an embodiment of this disclosure.
Figure 2:
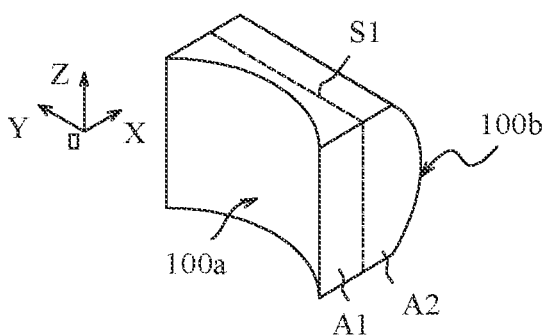
Figure 3:
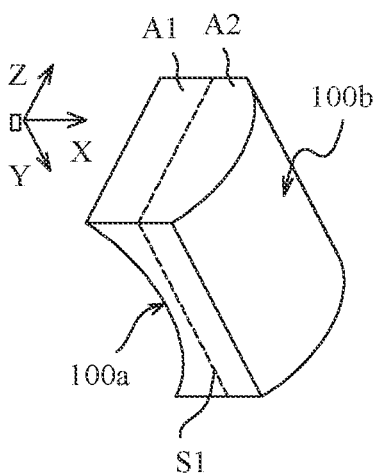
FIG. 3 is a three-dimensional diagram of another perspective of an optical component provided in an embodiment of this disclosure.
Figure 3:
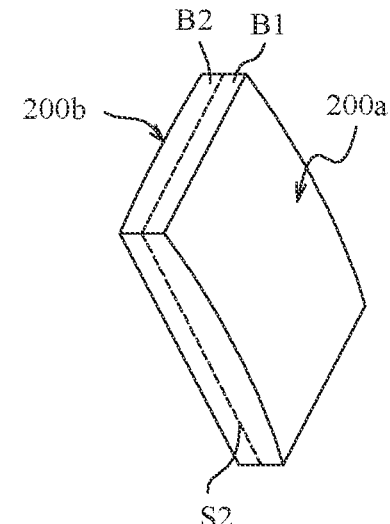

FIG. 1A is a side view when a laser cooperates with an optical component provided in an embodiment of this disclosure. FIG. 1B is a cutaway side view when a laser cooperates with an optical component provided in an embodiment of this disclosure. FIG. 2 is a three-dimensional diagram of a perspective of an optical component provided in an embodiment of this disclosure. FIG. 3 is a three-dimensional diagram of another perspective of an optical component provided in an embodiment of this disclosure.

Refer to FIG. 1A to FIG. 3. The optical component provided in this embodiment of this disclosure includes a first lens 100 and a second lens 200 that are arranged in an X-axis direction in sequence. The first lens 100 has a first shaping surface 100a and a second shaping surface 100b that are disposed opposite each other. The first shaping surface 100a is located on a surface of the first lens 100 that is away from the second lens 200, and the first shaping surface 100a is a cylinder whose generatrix is parallel to a Z-axis and that is recessed towards the first lens 100. The second shaping surface 100b is located on a surface of the first lens 100 that faces the second lens 200, and the second shaping surface 100b is a cylinder whose generatrix is parallel to a Y-axis and that protrudes away from the first lens 100. The second lens 200 has a third shaping surface 200a and a fourth shaping surface 200b that are disposed opposite each other. The third shaping surface 200a is located on a surface of the second lens 200 that is away from the first lens 100, and the third shaping surface 200a is a cylinder whose generatrix is parallel to the Z-axis and that protrudes away from the first lens 100. The fourth shaping surface 200b is located on a surface of the second lens 200 that faces the first lens 100, and the fourth shaping surface 200b is a cylinder whose generatrix is parallel to the Y-axis and that protrudes away from the second lens 200.

With reference to FIG. 1A and FIG. 1B, a laser 10 is located on a side of the first lens 100 that is away from the second lens 200, and emits a laser beam 20 in the X-axis direction. The beam 20 has two polarization directions that are perpendicular to each other: a first polarization direction (a Y-axis direction) and a second polarization direction (a Z-axis direction). The first polarization direction may be a slow axis direction of the laser 10, and the second polarization direction may be a fast axis direction of the laser 10. The laser 10 may be a semiconductor laser, or may be another laser that needs to collimate a beam.

With reference to FIG. 1A and FIG. 3, the first lens 100 is segmented into two parts: a sub-lens A1 and a sub-lens A2 by using a reference surface S1 between the first shaping surface 100a and the second shaping surface 100b, and the reference surface S1 is perpendicular to the X-axis. In this way, the sub-lens A1 between the reference surface S1 and the first shaping surface 100a is actually equivalent to a negative lens that can diverge an angle of divergence in the first polarization direction of the beam 20, and the sub-lens A2 between the reference surface S1 and the second shaping surface 100b is actually equivalent to a positive lens that can converge an angle of divergence in the second polarization direction of the beam 20.

Similarly, a reference surface S2 is located between the fourth shaping surface 200b and the third shaping surface 200a, and the reference surface S2 is perpendicular to the X-axis, so that the reference surface S2 segments the second lens 200 into two parts: a sub-lens B2 and a sub-lens B1. The sub-lens B2 is located between the fourth shaping surface 200b and the reference surface S2, and the sub-lens B1 is located between the third shaping surface 200a and the reference surface S2. In this way, the sub-lens B1 is actually equivalent to a positive lens that can converge the angle of divergence in the first polarization direction of the beam 20, and the sub-lens B2 is actually equivalent to a positive lens that can converge the angle of divergence in the second polarization direction of the beam 20.

Return to FIG. 1B. A change, in the first polarization direction, of the beam 20 emitted by the laser 10 is observed. After the beam 20 passes through the first shaping surface 100a, the angle of divergence in the first polarization direction of the beam 20 is enlarged by the sub-lens A1, in other words, an angle of divergence of a part of the beam 20 that is located in front of the first shaping surface 100a is less than an angle of divergence of a part of the beam 20 that is located between the first shaping surface 100a and the third shaping surface 200a. By appropriately adjusting a distance between the first shaping surface 100a and the third shaping surface 200a, the sub-lens B1 may collimate, in the first polarization direction, the beam 20 emitted by the sub-lens A1 to obtain parallel beams that are parallel to the X-axis.

The sub-lens A1 and the sub-lens B1 form a telephoto group, and a focal length of the telephoto group in the first polarization direction is greater than a total optical length from the laser 10 to the sub-lens B1. Therefore, the total optical length can be effectively reduced while an enough focal length of the optical component is ensured.

For example, a curvature range of the first shaping surface 100a is greater than 2, a curvature range of the third shaping surface 200a is greater than 5, and a distance between a generatrix of the first shaping surface 100a and a generatrix of the third shaping surface 200a is greater than or equal to 10 mm and is less than or equal to 100 mm. For example, curvature of the first shaping surface 100a is 4.221, curvature of the third shaping surface 200a is 19.71, and the distance between the generatrix of the first shaping surface 100a and the generatrix of the third shaping surface 200a is 23.2 mm. In addition, both the curvature of the first shaping surface 100a and the curvature of the third shaping surface 200a increase as the distance between the generatrix of the first shaping surface 100a and the generatrix of the third shaping surface 200a increases, so that the first shaping surface 100a and the third shaping surface 200a can have a good collimation effect on the beam 20 in the first polarization direction.

Then, refer to FIG. 1A. A change, in the second polarization direction, of the beam 20 emitted by the laser 10 is observed. After the beam 20 passes through the second shaping surface 100b, the angle of divergence in the second polarization direction of the beam 20 is converged once by the sub-lens A2. Then, the beam 20 passes through the fourth shaping surface 200b, and a distance between the second shaping surface 100b and the fourth shaping surface 200b is appropriately adjusted, so that beams 20 emitted by the sub-lens B2 to the sub-lens A2 are collimated in the second polarization direction to obtain parallel beams that are parallel to the X-axis.

For example, a curvature range of the second shaping surface 100b is greater than 2, a curvature range of the fourth shaping surface 200b is greater than 5, and a distance between a generatrix of the second shaping surface 100b and a generatrix of the fourth shaping surface 200b is greater than or equal to 5 mm and is less than or equal to 100 mm. For example, curvature of the second shaping surface 100b is 3.34, curvature of the fourth shaping surface 200b is 38.198, and the distance between the generatrix of the second shaping surface 100b and the generatrix of the fourth shaping surface 200b is 18.45 mm. In addition, both the curvature of the second shaping surface 100b and the curvature of the fourth shaping surface 200b increase as the distance between the generatrix of the second shaping surface 100b and the generatrix of the fourth shaping surface 200b increases, so that the second shaping surface 100b and the fourth shaping surface 200b can have a good collimation effect on the beam 20 in the second polarization direction.

In specific disposing, as shown in FIG. 1B, an optical axis of the laser 10 passes through a middle point of an arc formed by using an intermediate cross-section of the first shaping surface 100a, and a string of the arc is perpendicular to the optical axis of the laser 10, so that the first shaping surface 100a still has good symmetry after the beam 20 is processed. A relationship between the optical axis of the laser 10 and each of the second shaping surface 100b, the third shaping surface 200a, and the fourth shaping surface 200b is also set in a similar manner.

In the foregoing descriptions, the first shaping surface 100a and the third shaping surface 200a form a first shaping surface group, and the first shaping surface group performs optical path collimation on the first polarization direction (a slow axis) of the beam 20, to form, in the first polarization direction, parallel beams that are parallel to the X-axis. The second shaping surface 100b and the fourth shaping surface 200b form a second shaping surface group, and the second shaping surface group performs optical path collimation on the second polarization direction (a fast axis) of the beam 20, to form, in the second polarization direction, parallel beams that are parallel to the X-axis. In addition, the first shaping surface group does not interfere with the second polarization direction of the beam 20, and the second shaping surface group does not interfere with the first polarization direction of the beam 20. The two opposite surfaces of the first lens 100 and the two opposite surfaces of the second lens 200 are fully used. Only two lenses need to be disposed, so that light processing can be performed on the first polarization direction of the beam 20 twice, and light processing can be performed on the second polarization direction of the beam 20 twice, and there is no need to dispose one lens for each time of light processing. In this way, utilization of a lens surface is improved, and a quantity of lenses is reduced by 50%, and this helps reduce costs. In addition, the first shaping surface 100a and the second shaping surface 100b are integrated into the first lens 100, and the third shaping surface 200a and the fourth shaping surface 200b are integrated into the second lens 200. Compared with a case in which one lens is disposed separately for each time of light processing, and a gap is maintained between every two adjacent lenses, an integration degree of the optical component is higher, and a total optical length of the optical component is further shortened, and this helps implement miniaturization of the laser radar system. In addition, the first shaping surface 100a and the second shaping surface 100b are respectively disposed on the two opposite surfaces of the first lens 100, and a relative location relationship remains unchanged, and similarly, a relative location relationship between the third shaping surface 200a and the fourth shaping surface 200b also remains unchanged. Therefore, when the optical component is assembled, once the distance between the first shaping surface 100a and the third shaping surface 200a is adjusted, the relative location relationship between the second shaping surface 100b and the fourth shaping surface 200b is also adjusted. In this way, difficulty in assembling the optical component is reduced, and assembling precision is improved.

A structure form of the optical component in FIG. 1A to FIG. 3 is merely an example. For example, the first lens may further have the following variation on the foregoing basis. The first shaping surface is disposed on a surface of the first lens that faces the second lens, the first shaping surface is a cylinder that is recessed towards the first lens, and a generatrix direction of the first shaping surface is parallel to the second polarization direction, and the second shaping surface is disposed on a surface of the first lens that is away from the second lens, the second shaping surface is a cylinder that protrudes from the first lens, and a generatrix direction of the second shaping surface is still parallel to the first polarization direction. The first shaping surface may still enlarge the angle of divergence in the first polarization direction of the beam, and the second shaping surface still converges the angle of divergence in the second polarization direction of the beam. The curvature of the first shaping surface and the curvature of the second shaping surface are adjusted, or a distance between the first lens and the second lens is adjusted, so that a same effect as that achieved by adjusting the angle of divergence of the beam 20 by the optical component in FIG. 1A to FIG. 3 can be achieved in both the first polarization direction and the second polarization direction.

Similarly, the second lens may also have the following variation. The third shaping surface is disposed on a surface of the second lens that faces the first lens, the third shaping surface is a cylinder that protrudes away from the second lens, and a generatrix direction of the third shaping surface is parallel to the second polarization direction, and the fourth shaping surface is disposed on a surface of the second lens that is away from the first lens, the fourth shaping surface is a cylinder that protrudes away from the second lens, and a generatrix direction of the fourth shaping surface is parallel to the first polarization direction. The third shaping surface may still perform optical path collimation on the beam in the first polarization direction, and the fourth shaping surface may still perform optical path collimation on the beam in the second polarization direction. The curvature of the third shaping surface and the curvature of the fourth shaping surface are adjusted, or the distance between the first lens and the second lens is adjusted, so that a same effect as that achieved by adjusting the angle of divergence of the beam 20 by the optical component in FIG. 1A to FIG. 3 can be achieved.

Alternatively, there may be the following variation on the basis of the optical component in FIG. 1A to FIG. 3. The second shaping surface 100b is changed to a plane, when the beam 20 emitted by the laser 10 passes through the second shaping surface 100b, the angle of divergence of the beam remains unchanged in the second polarization direction, and when the beam 20 reaches the fourth shaping surface 200b, the beam 20 is directly collimated by the fourth shaping surface 200b to obtain parallel beams that are parallel to the X-axis. The curvature of the fourth shaping surface 200b is adjusted, for example, the curvature of the fourth shaping surface 200b is increased, and the beam 20 is collimated to obtain parallel beams in the second polarization direction at one time. Similarly, the second shaping surface 100b may be maintained as a convex cylinder, and the fourth shaping surface 200b is a plane. The curvature of the second shaping surface 100b is adjusted, so that when the beam 20 emitted by the laser reaches the second shaping surface 100b, the beam 20 is collimated in the second polarization direction to obtain parallel beams that are parallel to the X-axis. In addition, alternatively, the second shaping surface 100b may be set to a cylinder that is recessed towards the first lens 100 and whose generatrix is parallel to the first polarization direction. First, the angle of divergence in the first polarization direction of the beam 20 is diverged once, and then the beam 20 is collimated by the fourth shaping surface 200b to obtain parallel beams, to implement a relatively long focal length in the second polarization direction of the beam 20 by using a relatively small total optical length.

In the foregoing descriptions, that the first shaping surface 100a is a cylinder is merely an example structure form. Alternatively, the first shaping surface 100a may be another curved surface that is recessed towards the first lens 100, provided that the angle of divergence, in the first polarization direction, of the beam 20 emitted by the laser 10 can be diverged. Similarly, alternatively, the second shaping surface 100b, the third shaping surface 200a, and the fourth shaping surface 200b may not be cylinders, but are other curved surfaces that can converge an angle of divergence in a corresponding polarization direction of the beam 20.

Forms of the first shaping surface and the third shaping surface are not limited, provided that in the first lens and the second lens, the first shaping surface and the third shaping surface form the first shaping surface group, and the first shaping surface and the third shaping surface in the first shaping surface group exert a combined action on the beam emitted by the laser, and perform optical path collimation in the first polarization direction of the beam.

In the foregoing descriptions, the first polarization direction of the beam emitted by the laser is a slow axis direction of the laser, and the second polarization direction is a fast axis direction of the laser. However, this is not limited thereto. Alternatively, the first polarization direction is a fast axis direction of the laser, and the second polarization direction is a slow axis direction of the laser.

In addition, in FIG. 1A to FIG. 3, the laser 10 is located on a side of the first lens 100 that is away from the second lens 200, and an optical axis of the laser 10 is parallel to the X-axis and passes through the first shaping surface 100a, the second shaping surface 100b, the fourth shaping surface 200b, and the third shaping surface 200a in sequence. However, the foregoing disposing manner is not limited thereto. The laser 10 may be disposed at another location, for example, is deviated from the Z-axis or the Y-axis, provided that the emitted beam can finally pass through the first lens 100 and the second lens 200 in sequence in a manner of refraction and reflection.

An embodiment of this disclosure further provides a laser radar system, and the laser radar system includes a laser and the optical component provided in the foregoing embodiment. A beam emitted by the laser passes through a first lens and a second lens in sequence. Both a first shaping surface and a second shaping surface are integrated into the first lens and are respectively located on two opposite sides of the first lens, both a third shaping surface and a fourth shaping surface are integrated into the second lens and are respectively located on two opposite sides of the second lens, the first shaping surface and the third shaping surface form a first shaping surface group, the beam emitted by the laser is collimated to obtain parallel beams in a first polarization direction by using a combined action of the first shaping surface and the third shaping surface, the second shaping surface and the fourth shaping surface form a second shaping surface group, and the beam emitted by the laser is collimated to obtain parallel beams in a second polarization direction by using a combined action of the second shaping surface and the fourth shaping surface.

Therefore, there is no need to dispose one lens for each time of light processing on the beam, so that a quantity of used lenses is reduced, and costs are reduced. In addition, a negative lens in the first polarization direction formed by using the first shaping surface and a negative lens in the first polarization direction formed by using the third shaping surface form a telephoto group, and only a relatively small total optical length is required to implement a specific focal length in the first polarization direction. In the foregoing two manners, a total optical length of the optical component is reduced, and an integration degree of the optical component is improved, so that a volume of the laser radar system is reduced.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. An optical component comprising:

a first lens disposed in an emission path of a first beam and configured to emit second beams, and comprising:

a first shaping surface configured to diverge a first angle of divergence of the first beam in a first polarization direction of the first beam, wherein the first shaping surface is a first cylinder comprising a first generatrix; and a second shaping surface that is disposed opposite the first shaping surface, wherein the second shaping surface is a second cylinder comprising a second generatrix, and wherein the first generatrix and the second generatrix are perpendicular; and a second lens disposed opposite the first lens in a path of the second beams and comprising:

a third shaping surface configured to collimate the second beams to obtain first parallel beams in the first polarization direction; and a fourth shaping surface that is disposed opposite the third shaping surface, wherein the first shaping surface and the third shaping surface define a first shaping surface group that is configured to perform a first optical path collimation in the first polarization direction, wherein the second shaping surface and the fourth shaping surface define a second shaping surface group that is configured to perform a second optical path collimation in the second a second polarization direction, and wherein the second polarization direction is perpendicular to the first polarization direction.

2. The optical component of claim 1, wherein the first lens further comprises:

a first surface facing away from the second lens, wherein the first shaping surface is located on the first surface; and a second surface facing the second lens, wherein the second shaping surface is located on the second surface, and wherein the second lens further comprises:

a third surface facing away from the first lens, wherein the third shaping surface is located on the third surface; and a fourth surface facing the first lens, wherein the fourth shaping surface is located on the fourth surface.

3. The optical component of claim 2, wherein the third shaping surface is a third cylinder comprising a third generatrix, and wherein the first generatrix and the third generatrix are parallel to the second polarization direction.

4. The optical component of claim 3, wherein a first curvature of the first shaping surface and a second curvature of the third shaping surface increase as a distance between the first generatrix and the third generatrix increases.

5. The optical component of claim 1, wherein the second shaping surface is configured to converge a second angle of divergence in the second polarization direction, and wherein the fourth shaping surface is configured to collimate the second beams to obtain second parallel beams in the second polarization direction.

6. The optical component of claim 5, wherein the first lens further comprises a first surface facing the second lens, wherein the second shaping surface is located on the first surface, wherein the second lens further comprises a second surface facing the first lens, and wherein the fourth shaping surface is located on the second surface.

7. The optical component of claim 6, wherein the fourth shaping surface is a fourth cylinder comprising a fourth generatrix, and wherein the second generatrix and the fourth generatrix are parallel to the first polarization direction.

8. The optical component of claim 7, wherein a first curvature of the second shaping surface and a second curvature of the fourth shaping surface increase as a distance between the second generatrix and the fourth generatrix increases.

9. The optical component of claim 1, wherein the second generatrix is parallel to the first polarization direction, the second shaping surface is configured to collimate the second beams to obtain second parallel beams in the second polarization direction, and the fourth shaping surface is a first plane.

10. The optical component of claim 1, wherein the first polarization direction is a slow axis direction of the first beam, and wherein the second polarization direction is a fast axis direction of the first beam.

11. A laser radar system comprising:

a laser comprising a first beam; and an optical component communicatively coupled to the laser, and comprising:

a first lens disposed in an emission path of the first beam, and configured to emit second beams, and comprising:

a first shaping surface configured to diverge a first angle of divergence in a first polarization direction of the first beam, wherein the first shaping surface is a first cylinder comprising a first generatrix; and a second shaping surface that is disposed opposite the first shaping surface, wherein the second shaping surface is a second cylinder comprising a second generatrix, and wherein the first generatrix and the second generatrix are perpendicular; and a second lens disposed opposite the first lens in a path of the second beams and comprising:

a third shaping surface configured to collimate the second beams to obtain first parallel beams in the first polarization direction; and a fourth shaping surface that is disposed opposite the third shaping surface, wherein the first shaping surface and the third shaping surface define a first shaping surface group that is configured to perform a first optical path collimation in the first polarization direction, wherein the second shaping surface and the fourth shaping surface define a second shaping surface group that is configured to perform a second optical path collimation in a second polarization direction, and wherein the second polarization direction is perpendicular to the first polarization direction.

12. The laser radar system of claim 11, wherein the first lens further comprises:

a first surface facing away from the second lens, wherein the first shaping surface is located on the first surface; and a second surface facing the second lens, wherein the second shaping surface is located on the second surface, and wherein the second lens further comprises:

a third surface facing away from the first lens, wherein the third shaping surface is located on the third surface; and a fourth surface facing the first lens, wherein the fourth shaping surface is located on the fourth surface.

13. The laser radar system of claim 12, wherein the third shaping surface is a third cylinder comprising a third generatrix, and wherein the first generatrix and the third generatrix are parallel to the second polarization direction.

14. The laser radar system of claim 13, wherein a first curvature of the first shaping surface and a second curvature of the third shaping surface increase as a distance between the first generatrix and the third generatrix increases.

15. The laser radar system of claim 11, wherein the second shaping surface is configured to converge a second angle of divergence in the second polarization direction, and wherein the fourth shaping surface is configured to collimate the second beams to obtain second parallel beams in the second polarization direction.

16. The laser radar system of claim 15, wherein the first lens further comprises a first surface facing the second lens, wherein the second shaping surface is located on the first surface, wherein the second lens further comprises a second surface facing the first lens, and wherein the fourth shaping surface is located on the second surface.

17. The laser radar system of claim 16, wherein the fourth shaping surface is a fourth cylinder comprising a fourth generatrix, and wherein the second generatrix and the fourth generatrix are parallel to the first polarization direction.

18. The laser radar system of claim 17, wherein a first curvature of the second shaping surface and a second curvature of the fourth shaping surface increase as a distance between the second generatrix and the fourth generatrix increases.

19. The laser radar system of claim 11, wherein the second shaping surface is a second plane, the fourth shaping surface is a fourth cylinder comprising a fourth generatrix that is parallel to the first polarization direction, and the fourth shaping surface is configured to collimate the second beams to obtain third parallel beams in the second polarization direction.

20. The laser radar system of claim 11, wherein the first polarization direction is a slow axis direction of the first beam, and wherein the second polarization direction is a fast axis direction of the first beam.

21. An optical component comprising:

a first lens disposed in an emission path of a first beam and configured to emit second beams, and comprising:

a first shaping surface configured to diverge a first angle of divergence of the first beam in a polarization direction of the first beam, wherein the first shaping surface is a first cylinder comprising a first generatrix; and a second shaping surface that is disposed opposite the first shaping surface, wherein the second shaping surface is a second cylinder comprising a second generatrix, and wherein the first generatrix and the second generatrix are perpendicular; and a second lens disposed opposite the first lens in a path of the second beams and comprising:

a third shaping surface configured to collimate the second beams to obtain first parallel beams in the polarization direction; and a fourth shaping surface that is disposed opposite the third shaping surface.

* * * * *